(12) United States Patent
Novotny et al.

(10) Patent No.: US 10,904,009 B2
(45) Date of Patent: Jan. 26, 2021

(54) BLOCKCHAIN IMPLEMENTING DELTA STORAGE

(71) Applicant: International Business Machines Corporation, Armonk, NY (US)

(72) Inventors: Petr Novotny, Mount Kisco, NY (US); Qi Zhang, Yorktown Heights, NY (US); Venkatraman Ramakrishna, Singapore (SG); Nitin Gaur, Roundrock, TX (US); Donna N. Dillenberger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 15/992,268

(22) Filed: May 30, 2018

(65) Prior Publication Data

US 2019/0372772 A1    Dec. 5, 2019

(51) Int. Cl.
*H04L 29/06*    (2006.01)
*H04L 9/32*    (2006.01)

(52) U.S. Cl.
CPC ........ *H04L 9/3236* (2013.01); *H04L 2209/38* (2013.01)

(58) Field of Classification Search
CPC .......................... H04L 9/3236; H04L 2209/38
See application file for complete search history.

(56) References Cited

U.S. PATENT DOCUMENTS

| | | | |
|---|---|---|---|
| 7,539,685 B2 | 5/2009 | Mosescu | |
| 7,747,589 B2 | 6/2010 | Lomet | |
| 9,787,322 B2 | 10/2017 | Strohm | |
| 2005/0131782 A1* | 6/2005 | Thuneby | G06Q 40/12 705/30 |
| 2015/0269215 A1* | 9/2015 | Lehouillier | G06F 16/2358 707/626 |
| 2017/0038978 A1 | 2/2017 | Li et al. | |

(Continued)

FOREIGN PATENT DOCUMENTS

| CN | 107679863 A | 2/2018 |
|---|---|---|
| WO | 2018026727 A1 | 2/2018 |

OTHER PUBLICATIONS

International Search Report and Written Opinion issued in the corresponding International Application No. PCT/EP2019/062997, dated Jul. 19, 2019.

(Continued)

*Primary Examiner* — Joseph P Hirl
*Assistant Examiner* — Chi D Nguy

(57) ABSTRACT

An example operation may include one or more of executing a blockchain transaction which generates modifications to an asset, identifying a most recent version of the asset comprising most recent values of the asset before the blockchain transaction, generating a delta block for the executed blockchain transaction identifying differences between the modifications to the asset and the most recent version of the asset introduced by the blockchain transaction being executed while excluding unmodified values of the most recent version of the asset which are not modified by the executed blockchain transaction, and hashing the delta block to generate a hashed delta block and storing the hashed delta block on a distributed ledger.

20 Claims, 11 Drawing Sheets

(56) References Cited

U.S. PATENT DOCUMENTS

2017/0364701 A1    12/2017  Struttmann
2018/0268483 A1*   9/2018   Jayaram ................ G06Q 40/04

OTHER PUBLICATIONS

Ayush Dubey, Greg D. Hill, Robert Escriva, and Emin Gün Sirer, "Weaver: A high-performance, transactional graph store based on refinable timestamps," CoRR, abs/1509.08443 (2015).

Deepak R. Bobbarjung, Suresh Jagannathan, and Cezary Dubnicki, "Improving duplicate elimination in storage systems," ACM Transactions on Storage (TOS) TOS Homepage archivevol. 2 Issue 4, Nov. 2006, pp. 424-448.

Randal C. Burns, and Darrell D. E. Long, "Efficient distributed backup with delta compression," IOPADS '97: Proceedings of the fifth workshop on I/O in parallel and distributed systems, San Jose, CA, USA, pp. 26-36.

Tuomas Pelkonen, Scott Franklin, Justin Teller, Paul Cavallaro, Qi Huang, Justin Meza, and Kaushik Veeraraghavan, "Gorilla: A fast, scalable, in-memory time series database," Proceedings of the VLDB Endowment 8, No. 12 (2015): pp. 1816-1827.

* cited by examiner

FIG. 4A

```
                    Initial Asset 400

{
         "vin": "WFRE2956473627384957"
         "year": "2018"
         "miles": "1023"
         "Owner: {
                "name": "John Dow",
                "address": 725 5th Ave. New York, NY 10022"
         }
         "maker": "Tesla"
         "model": "Model XY"
         "type": "full size"
    }
```

FIG. 4B

First Modification 410

// Change address to: 354 Hunter St., Ossining, NY 10562

```
{
    "vin": "WFRE2956473627384957"
    "year": "2018"
    "miles": "1023"
    "Owner: {
        "name": "John Dow",                       ⎯ 411
        "address": "354 Hunter St., Ossining, NY 10562"
    }
    "maker": "Tesla"
    "model": "Model XY"
    "type": "full size"
}
```

Second Modification 420

// Remove "year": 2018

```
{
    "vin": "WFRE2956473627384957"

"miles": "1023"
421 "Owner: {
        "name": "John Dow",
        "address": 725 5th Ave. New York, NY 10022"
    }
    "maker": "Tesla"
    "model": "Model XY"
    "type": "full size"
}
```

FIG. 4C

Delta Modifications 430

// Change address to: 354 Hunter St., Ossining, NY 10562 additions: —432
{
  "owner":{
    "address": "354 Hunter St., Ossining, NY 10562"
  }
}

// Remove "year": 2018 reductions: —434
{
  "year": 2018
}

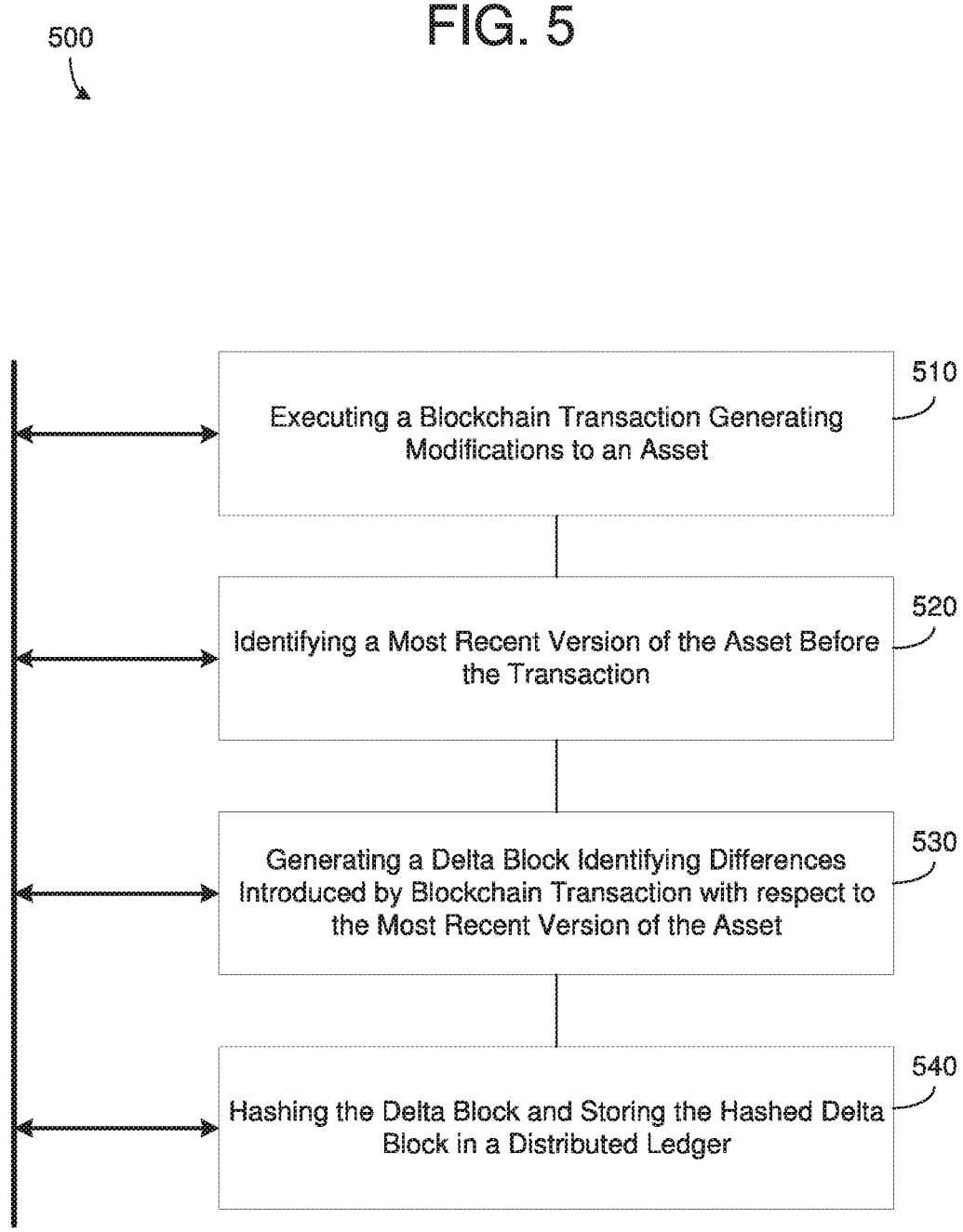

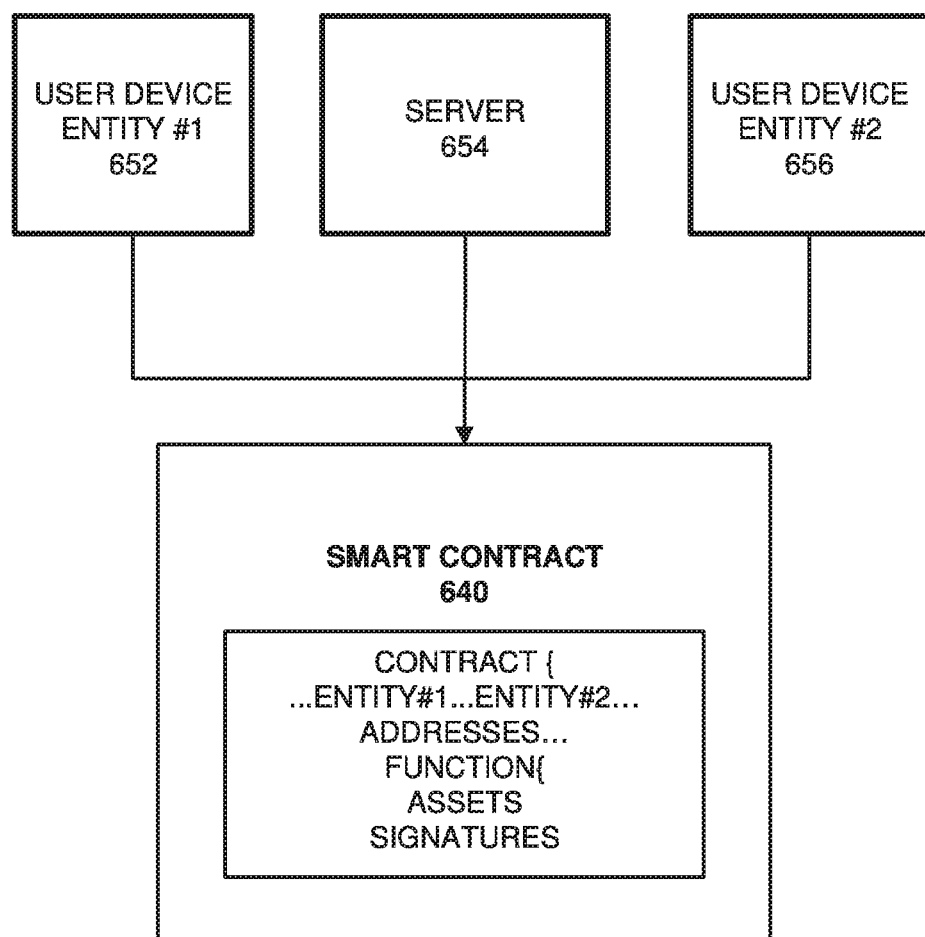

US 10,904,009 B2

BLOCKCHAIN IMPLEMENTING DELTA STORAGE

TECHNICAL FIELD

This application generally relates to a system for reducing redundant data storage, and more particularly, to a distributed ledger (such as a blockchain) which generates and stores delta values of an asset caused by a transaction instead of the whole asset thereby significantly reducing the amount of redundant data stored on the distributed ledger.

BACKGROUND

A ledger is commonly defined as an account book of entry, in which transactions are recorded and visible to authorized users. A distributed ledger is ledger that is replicated in whole or in part to multiple computing system. One type of distributed ledger is a cryptographic distributed Ledger (CDL) which can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

The distributed ledger is a continuously growing list of records that typically apply cryptographic techniques such as storing cryptographic hashes relating to other blocks. Although, primarily used for financial transactions, a blockchain can store other assets such as information related to goods and services (i.e., products, packages, status, software, data, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Furthermore, each block contains a timestamp and a link to a previous block thereby creating a tamper-proof chain of transaction history. Because blockchain is a distributed system, before adding a transaction to the blockchain ledger, peers need to reach a consensus status.

Conventionally, to adhere to business tenets of a true blockchain such as trade, trust, ownership, and the like, transactions of an asset stored in the distributed ledger are designed to replicate datasets of the assets already present in the ledger. The replicated asset is then used to overwrite previous versions of the asset. Assets often include tens, hundreds, and even thousands of values which are often stored in a file. In many cases though, a transaction may only update a small fraction of these asset values. Therefore, redundantly storing an entire asset is a computationally expensive approach (i.e., CPU, IO/Memory, power, etc.), and has a negative impact on the economic viability and longevity of the blockchain. As such, what is needed is a mechanism for reducing the amount of data stored on the distributed ledger.

SUMMARY

One example embodiment may provide a method that includes one or more of executing a blockchain transaction which generates modifications to an asset, identifying a most recent version of the asset comprising most recent values of the asset before the blockchain transaction, generating a delta block for the executed blockchain transaction identifying differences between the modifications to the asset and the most recent version of the asset introduced by the blockchain transaction being executed while excluding unmodified values of the most recent version of the asset which are not modified by the executed blockchain transaction, and hashing the delta block to generate a hashed delta block and storing the hashed delta block on a distributed ledger.

Another example embodiment may provide a system that includes one or more of a network interface configured to receive a blockchain transaction, and a processor configured to one or more of execute the blockchain transaction which generates modifications to an asset, identify a most recent version of the asset that comprises most recent values of the asset before the blockchain transaction, generate a delta block for the executed blockchain transaction that identifies differences between the modifications to the asset and the most recent version of the asset introduced by the executed blockchain transaction and that excludes unmodified values of the most recent version of the asset which are not modified by the executed blockchain transaction, and hash the delta block to generate a hashed delta block and store the hashed delta block on a distributed ledger.

A further example embodiment may provide a non-transitory computer readable medium comprising instructions, that when read by a processor, cause the processor to perform one or more of executing a blockchain transaction which generates modifications to an asset, identifying a most recent version of the asset comprising most recent values of the asset before the blockchain transaction, generating a delta block for the executed blockchain transaction identifying differences between the modifications to the asset and the most recent version of the asset introduced by the blockchain transaction being executed while excluding unmodified values of the most recent version of the asset which are not modified by the executed blockchain transaction, and hashing the delta block to generate a hashed delta block and storing the hashed delta block on a distributed ledger.

BRIEF DESCRIPTION OF THE DRAWINGS

FIGS. 4A-4C are diagrams illustrating data sets of an asset that is modified according to various example embodiments.

FIG. 5 is a diagram illustrating of method for generating and storing a delta block, according to example embodiments.

FIG. 6B is a diagram illustrating a smart contract configuration among contracting parties and a mediating server configured to enforce smart contract terms on a blockchain, according to example embodiments.

DETAILED DESCRIPTION

Figure 1:
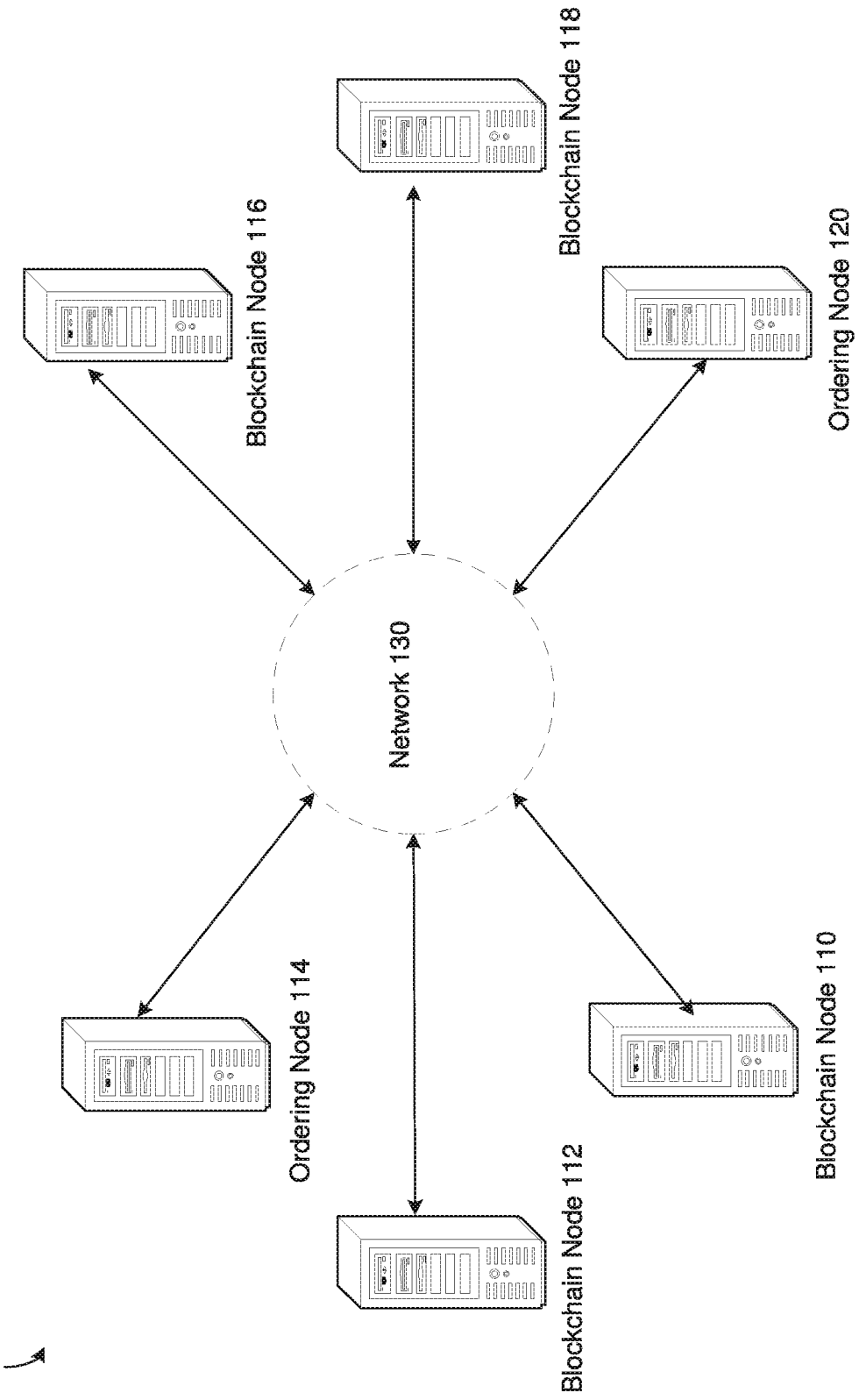
FIG. 1 is a diagram illustrating a blockchain network for delta storage, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed to methods, devices, networks and/or systems, which support a blockchain that stores a difference (delta) of an asset that is modified by a transaction rather than an entire replica of the asset. During a first transaction of the asset on the distributed ledger, all values of the asset may be committed to the ledger. However, for each subsequent transaction that modifies the asset, only the values of the asset that are modified by that transaction may be stored on the distributed ledger while unmodified values are excluded. That is, instead of storing an entire copy of an asset which may include many values (e.g., 10, 50, 100, 500, 1000 etc.) each time the asset is modified, the blockchain may store an identification of only those values which are modified (e.g., added, changed, removed, etc.) by the transaction with respect to a most recently stored version of the asset. In contrast, a typical blockchain ledger overwrites a previously stored version of an asset and therefore must store a replica of all asset values (i.e., both modified and unmodified) even when only a fraction of the asset values are modified. As a result, the system herein significantly reduces the amount of data stored on the distributed ledger because only delta/changes of an asset per transaction are stored rather than a replicated copy of the entire asset.

To record the difference in an asset, the blockchain according to various aspects may store delta transactions within a block of a blockchain. Furthermore, each block may contain multiple transactions (delta transactions, regular transactions, etc.) In a delta transaction, only the values of the asset which are modified by the transaction are recorded rather than storing all values of an asset. The blocks which include records of one or more delta transactions are referred to herein as "delta" blocks. It should be appreciated that the blockchain system described herein is not limited to only delta transactions but may also perform regular blockchain transactions (e.g., such as initial transactions with new assets, etc.) Therefore, a delta block may, in some cases, store both delta transactions and regular blockchain transaction content. The distributed ledger and the blocks are unaffected by storing of the deltas of transactions. Rather, the modification is within the block content itself and an extension of the blockchain platform. Hence, a traditional block and a "delta" block only differ based on content. Therefore, each delta block may store the content of one or more delta transactions and may also store the content of one or more traditional blockchain transactions. Accordingly, a delta block should not be understood as limited to only storing delta transactions.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. The smart contract aspect of a blockchain may be used to implement the delta storage of an asset. Smart contracts use assets recorded on the distributed ledger to execute transactions and generate delta values. The most recent version of an asset may be identified from a world state of the asset on the distributed ledger. Further, smart contracts may invoke changes to the distributed ledger.

According to various aspects, the delta storage of an asset is implemented by identifying a latest version of an asset identified from the world state of the asset. The world state may represent or otherwise keep track of the most recent version of an asset using pairs of key/values stored via blocks on a distributed ledger which are linked together via cryptographic hash functions. The world state may be identified from a hash-linked chain of blocks associated with the asset. With the use of the delta, the world state may be maintained by projecting only changes/modifications to asset values contained in transactions already in world state during the block commitment phase. This is different from traditional blockchain systems where all of the content or world state is replaced with every new state caused by a transaction. Furthermore, when a transaction is generated and a write-set is produced, the write-set may contain only the delta value(s) of the asset.

Some of the benefits of the blockchain system described herein is that it improves the functionality of a computing system (blockchain nodes) by significantly reducing the storage required for the ledger (and the world state). Through the blockchain system described herein, a computing system can reduce the amount of data stored each time an asset is modified because a smart contract may only identify and record modifications to the asset in subsequent blocks while excluding unmodified values of the asset which remain the same. Furthermore, the delta storage improves system performance because it reduces the amount of data which need to be hashed, stored, and transferred by the various components of the blockchain network. More specifically, smaller transactions mean less data to hash when a transaction is endorsed and checked at various places such as by the peer when it arrives in blocks. Furthermore, the block itself is smaller so its transfer and processing is faster.

The delta storage also improves the calculation of world state at start-up of a peer, by reducing the amount of data needed to validate/hash and overall process time to read from a drive, store in memory, etc. The delta storage also affects the amount of data transferred on a network between peer nodes, orderer nodes, etc. As another example, the delta storage improves the ability of blockchain to store larger pieces of data such as files (e.g. pdfs, binary, etc.) by reducing the impact of these on the total size of the ledger.

FIG. 1 illustrates a blockchain network 100 ("blockchain") for delta storage, according to example embodiments. Referring to FIG. 1, the blockchain network 100 includes a plurality of nodes which in this non-limiting example include blockchain peer nodes 110, 112, 116, and 118, and ordering nodes 114 and 120. The network of nodes may communicate with each other via a network 130 which may be the Internet, a private network, or the like. As described herein, the blockchain 100 is a distributed system which includes multiple nodes that communicate with each other. The blockchain nodes may operate programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. In FIG. 1, any of the blockchain peer nodes and/or ordering nodes may also serve as endorsing nodes. Other transactions which are not endorsed are disregarded. There may exist one or more special chaincodes for management functions and parameters, collectively called system chaincodes.

The nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser, and broadcasts transaction-proposals to an ordering service (e.g., ordering node 114, 120, etc.). Another type of node is a peer node (e.g., blockchain peer nodes 110, 112, 116, and 118) which can receive client submitted transactions, commit the transactions and maintain a state and a copy of the ledger of blockchain transactions. Peers can also have the role of an endorser, although it is not a requirement. The ordering-service-nodes 114 and 120 are nodes running the communication service for all nodes, and which implement a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain and may be replicated and managed in a distributed manner among the peer nodes 110, 112, 116, and 118. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. Here, the asset key/value pairs may include a key which identifies a name of the field (e.g., name, address, type, product, etc.) and a value which includes the specific data associated with the key. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as the world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Figure 2A:
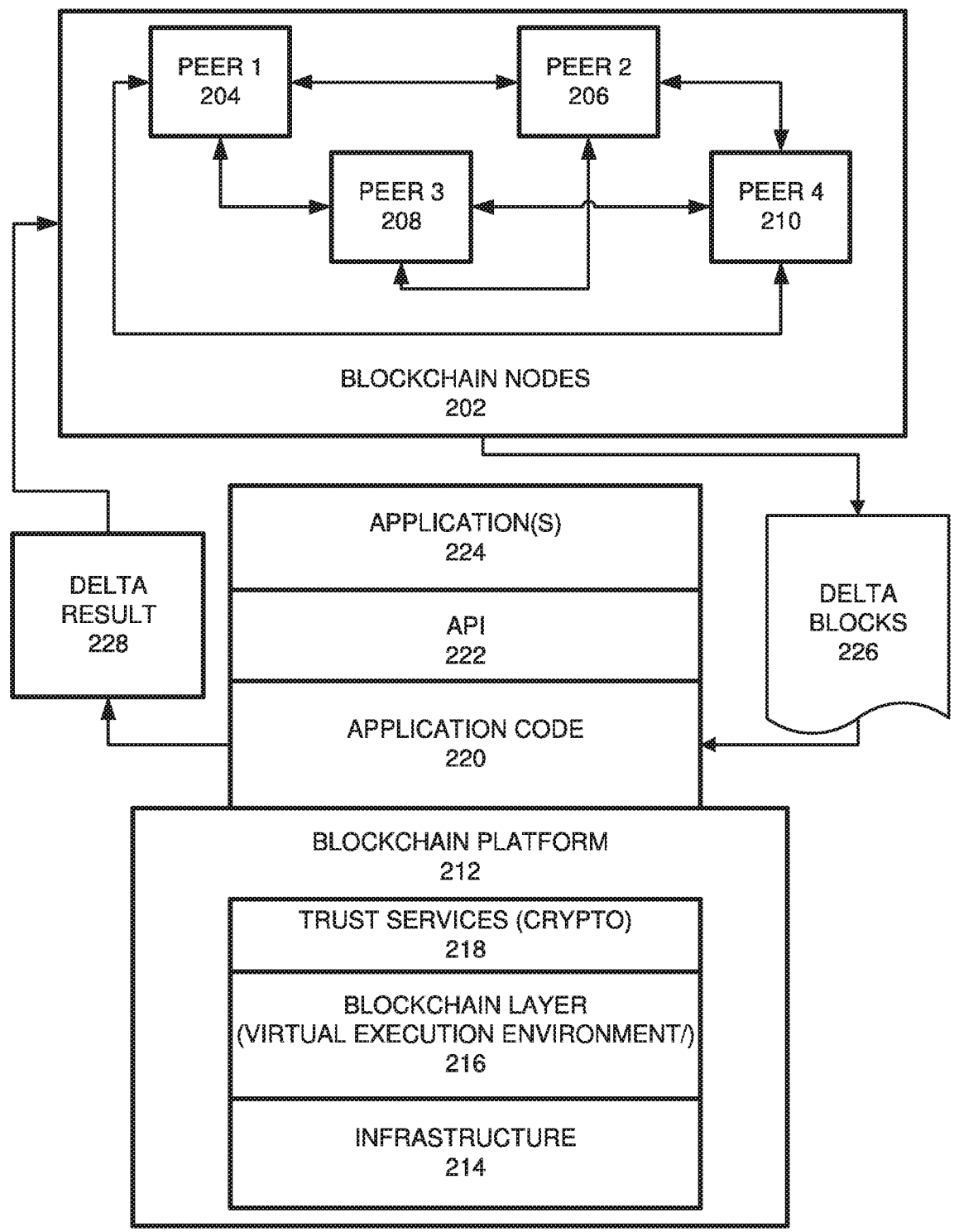
FIG. 2A is a diagram illustrating a peer node blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, delta block information 226 may be processed by one or more processing entities (e.g., virtual machines) included in the blockchain layer 216. The delta block information 226 may include a hash-linked chain of delta blocks which link together all changes made to an asset over time on the blockchain. For example, a most recent transaction of the asset may be identified from a head block storing initial values of the asset and tracking incremental changes to the asset in the trailing blocks of the chain. The delta result 228 may include the world state of the asset identified from the delta block information 226. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, the chaincode may introduce modifications to an asset via storage of delta blocks representing differences in the asset with respect to the most recent version of the asset. One function may be to add new values to the asset, change values of the asset, delete values of the asset, and the like, which may be provided to one or more of the nodes 204-210.

Figure 2B:
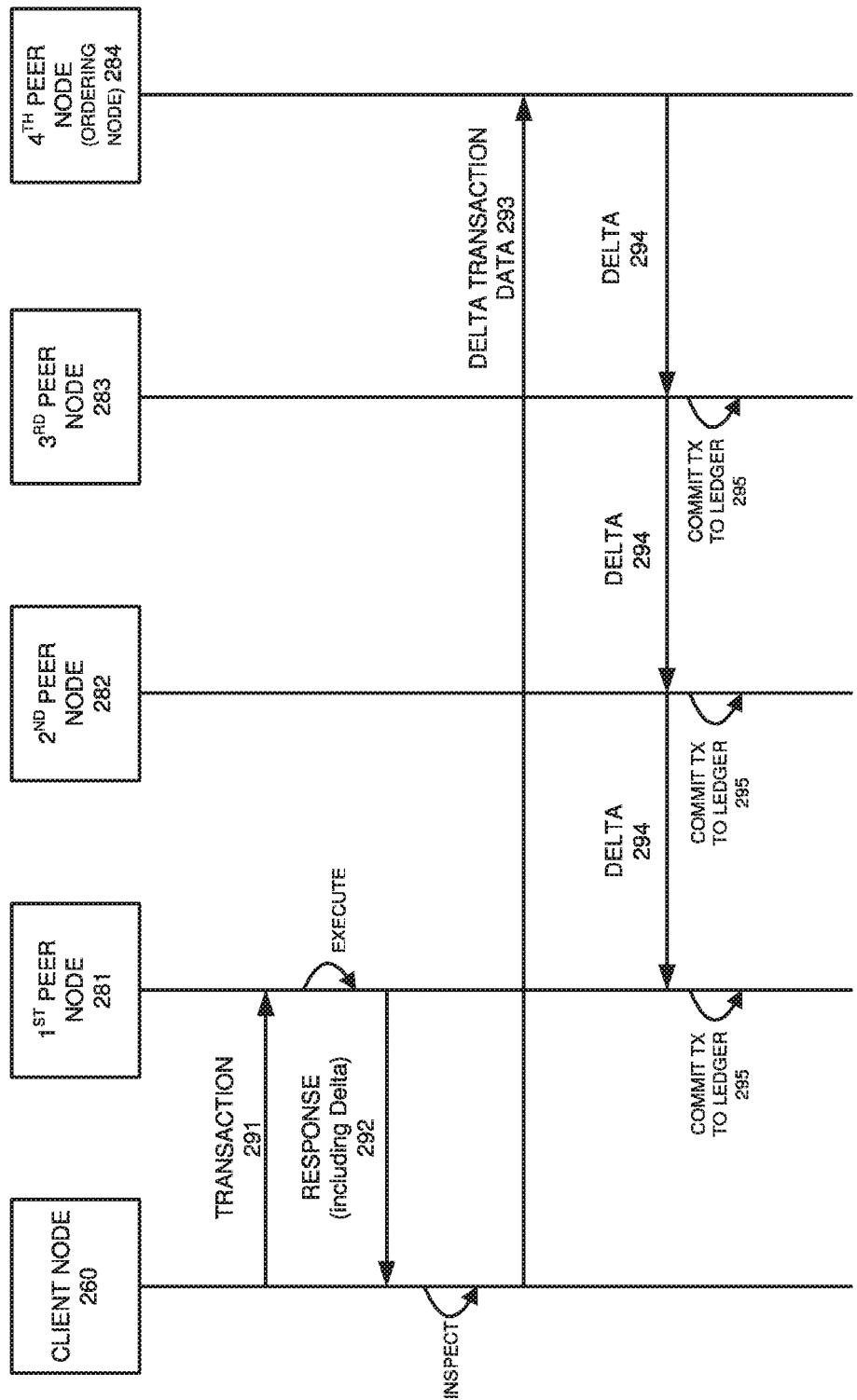
FIG. 2B is a diagram illustrating a peer node communication process, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). According to various aspects, the write set may include delta values of an asset while excluding unchanged values of the asset. The proposal response 292 is sent back to the client 260 along with an endorsement signature, if approved. The client 260 assembles the endorsements into a transaction payload 293 including the delta block information and broadcasts it to an ordering service node 284. The ordering service node 284 then delivers ordered transactions as blocks (referred to herein as delta blocks) to all peers 281-283 on a channel. Before committal to the blockchain, each peer 281-283 may validate the transaction by validating the delta blocks. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. As described herein, rather than include a completely new copy of an asset and its key/value pairs, the write set may include only a listing of the asset key/value pairs that are modified by the transaction. However, no updates are made to the ledger at this point. In 292, the set of values, along with the endorsing peer node's 281 signature is passed back as a proposal response 292 to the SDK of the client 260 which parses the payload for the application to consume. According to various embodiments, the response 292 may include the delta values that is generated by the endorsing peer node 281.

In response, the application of the client 260 inspects/ verifies the endorsing peer's signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal including the delta values of the asset and response within a transaction message to the ordering node 284. The transaction may contain the read/write sets having the delta values, the endorsing peer's signatures, and a channel ID. The ordering node 284 does not need to inspect the entire content of a transaction in order to perform its operation, instead the ordering node 284 may simply receive transactions from all channels in the network, order them chronologically by channel, and create delta blocks of transactions per channel.

The delta blocks of the transaction are delivered from the ordering node 284 to all peer nodes 281-283 on the channel. The delta transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
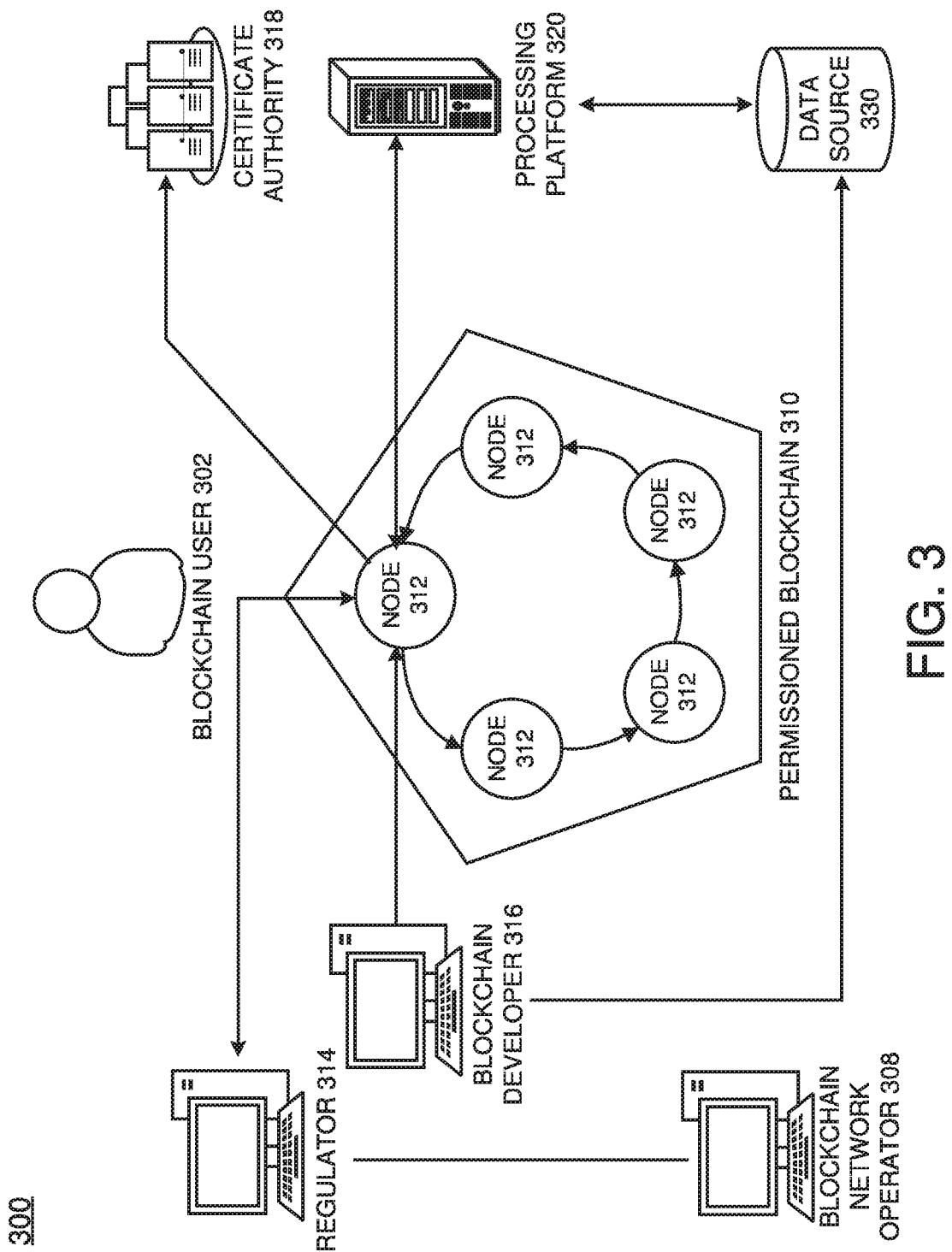
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. The transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 312 manage member permissions, such as enrolling the regulator system 308 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

FIGS. 4A-4C illustrate data sets of an asset that is modified according to various example embodiments. Referring to FIG. 4A an initial asset 400 is shown. The asset itself may be stored as part of a file (e.g., JavaScript Object Notation, XML, etc.) The initial asset 400 includes a plurality of key/value pairs for the asset (e.g., an automobile) having keys for a yin number, a year, a number of miles, an owner which includes both name and address keys, a maker, a model, and a type. Each of the keys also includes a respective value with the respective data associated with the initial asset 400.

A smart contract may be executed by a blockchain node to invoke updates or modifications to the key/value pairs of the initial asset 400. For example, FIG. 4B illustrates a related modification process by which a whole asset is overwritten. In this example, the smart contract changes only a single key/value pair for the address, however, the modified asset stores all key/value pairs of the asset and not just the modified key/value pairs. The modified asset is then used to overwrite (i.e., replace) any previous versions of the asset. Referring to FIG. 4B, a first modification 410 to an asset includes changing a value for an address 411 of the owner of the asset. However, the modified version of the asset 410 includes a copy of all key/value pairs of the asset, not just those being modified. FIG. 4B also illustrates a second modification 420 to the asset which includes a removal of a year 421 from the asset values. To remove the key/value pair of the year 421, the smart contract removes the value. However, the second modification 420 stores all of the previous key/value pairs that are not being modified. As a result, redundant storage is created by both the first modification 410 and the second modification 420.

Meanwhile, FIG. 4C illustrates a delta modified asset 430 that is modified according to various embodiments. Referring to FIG. 4C, a difference (delta) of an asset is stored within the data block instead of the whole asset. A transaction in blockchain has a write set, which contains a list of modified assets as a key/value pairs. In the example of FIG. 4B, new or updated version of the whole asset is stored in the write set. As a result, the write set in FIG. 4B contains both the modified and unmodified parts/fields of the asset. In contrast, in FIG. 4C the delta block stores only a delta from the previous version of the asset in the write set. The write set in the delta modified asset 430 thus contains only the modified parts/fields of the asset.

The delta may be determined by comparing changes introduced by a chaincode into an asset, against the latest version of the asset stored in the world state which is determined from the most recent version of the asset on the distributed ledger. When an asset is stored for the first time on the ledger, the write set may contain the whole asset including all key/value pairs. However, when an asset is updated by a subsequent transaction, the write set may contain only the delta. The delta value may include one or more parts such as additions, reductions, and the like. For example, additions 432 may identify new or updated data (fields) introduced by the executed transaction with respect to the most recent previous version of the asset. As another example, reductions 434 may identify data (fields) removed from the previous version by positively listing the value that is being removed.

In the case of a JSON document for the asset, the delta may be calculated with standard graph theoretical algorithms. In case of binary or text data for the asset, appropriate standard algorithm may be used (e.g., mem diff algorithms, etc.).

In Hyperledger Fabric and other blockchains, data (assets) is represented and stored as key/value pairs. Assets are typically structured as complex JSON documents consisting of a series of fields, elements and arrays. An asset can be repeatedly updated over its lifetime (e.g., an order or invoice is updated with a new address, status, line items, etc.). The asset is updated by inserting a new transaction into the ledger. In most cases, the transaction modifies only a small subset of the fields of the asset while all other fields of the asset remain the same.

The approach of updating an asset as a whole leads to repeated storage of the unmodified and thus redundant data. The negative implications include a large ledger caused by storage of redundant data especially in ledgers storing a large number of transactions over an extensive period of time. This leads to an unnecessarily large ledger where significant parts of the ledger content is redundant. This approach also causes difficult ledger analysis because storing whole assets makes analysis of changes challenging (e.g., in inspection, audit, analytics, etc.) The analysis needs to quickly determine what has changed which is slowed when a system has to analyze complex assets to determine changes. This approach also causes a decreased system performance because processing each transaction requires the system to read, write, transport and process the whole documents, thus imposing higher IO and processing overhead.

In contrast, storing delta blocks of a transaction as described herein leads to significant improvement of several performance and operational aspects. Computing transaction deltas (increments/decrements) is not limited to Hyperledger Fabric. All blockchains, or smart contract platforms, as effectively distributed transaction processing systems that must support concurrent transaction submissions, conflict resolutions and maintain ledger integrity. Blocks of transactions containing deltas can be appended to a hash-chain in a proof-of-work-based platform such as Ethereum. This can be done without changing Ethereum transaction validation and commitment semantics, just as in Hyperledger Fabric.

Some of the technical benefits of the delta storage described herein include smaller transactions and thus less data stored in ledger. This can be particularly important for ledgers storing large number of transactions and for long periods of time. Other benefits include faster storage of transactions and blocks, faster ledger validation and thus faster start of a peer, less data exchanged within the system (between peers, orderers, etc.) resulting in a higher transaction throughput, and an overall increase of performance of the Blockchain system due to lower IO and processing requirements. Furthermore, system and smart contract design benefits enable data architects and smart contract designers to structure data without concern for data redundancy and storage requirements Furthermore, for blockchain host platforms there is a reduction of operational requirements because less resources needed for operation. Also, audit tools, analytical tools, compliance tools, and the like, benefit from better structured assets stored in ledger thereby enabling design algorithms to be easier and faster. Furthermore, the smaller size of the ledger increases processing speed and decreases operational requirements.

FIG. 5 illustrates a method 500 for generating and storing a delta block, according to example embodiments. For example, the method 500 may be implemented via a smart contract executed by a blockchain node. As another example, the method 500 may be performed by a database, a server, or another type of computing system. Referring to FIG. 5, in 510 the method may include executing a blockchain transaction which generates modifications to an asset. For example, the blockchain transaction may be requested by a client node and may modify an already existing asset that has been stored on the blockchain.

In 520, the method may include identifying a most recent version of the asset that includes the most recent values of the asset before the blockchain transaction was executed in step 510. For example, the blockchain node may identify the most recent version of the asset from a world state of the distributed ledger. The world state may be obtained by reconstructing the most recent version of the asset using a hash-linked chain of delta blocks stored in the distributed ledger and which is replicated across a plurality of blockchain peers of a common blockchain network. The world state may include write-sets of all modified versions of the asset which include only the delta values changed by the respective transaction while excluding any other values not changed as a result of the transaction.

In 530, the method may include generating a delta block for the blockchain transaction executed in 510 identifying differences between the modifications to the asset and the most recent version of the asset introduced by the blockchain transaction being executed in 510 while excluding unmodified values of the most recent version of the asset which are not modified by the executed blockchain transaction. Furthermore, in 540 the method may include hashing the delta block to generate a hashed delta block and storing the hashed delta block on a distributed ledger. As an example, the generated delta block may include a write-set for the executed blockchain transaction that includes a list of asset values that are at least one of new, updated, and deleted by the executed blockchain transaction and that excludes any asset value of the most recent version of the asset not modified by the executed blockchain transaction.

In some embodiments, the generated delta block may include a list of modified key/value pairs of the asset introduced by the executed blockchain transaction and excludes unmodified key/value pairs of the asset of the most recent version of the asset. In some embodiments, the most recent version of the asset may include a set of key/value pairs, and the modifications to the asset introduced by the blockchain transaction being executed may include modifications to only a partial set of the key/value pairs from the set of key/value pairs. In some embodiments, the method may further include inserting a pointer within the delta block that references to a previous delta block on the distributed ledger corresponding to a most recent transaction that has modified the asset. In some embodiments, the storing may include storing the generated delta block in a chain of delta blocks hash-linked together and including a head block storing initial asset values of the asset. For example, the chain of delta blocks hash-linked together may include an incremental linked list identifying modifications to the asset in chronological order.

Figure 6A:
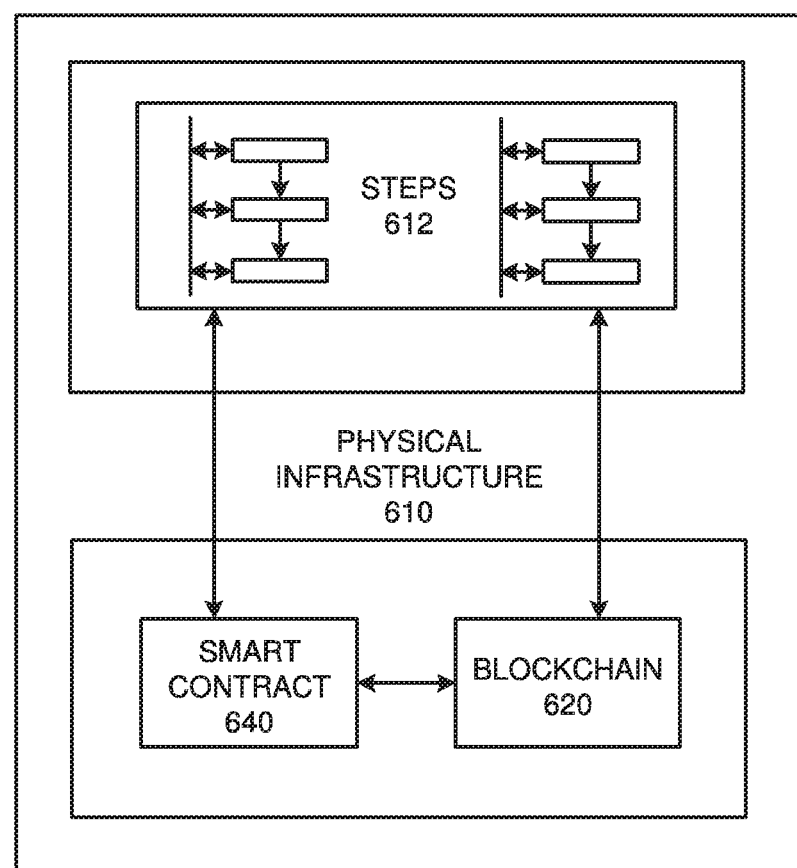
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. For example, the smart contract 640 may execute transactions and invoke delta changes to the blockchain ledger thereby updating a world state of an asset with delta values of the asset instead of entire overwrites of all values of an asset. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction. According to various embodiments, the results may include delta values of an asset rather than an overwrite of all values of the asset.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
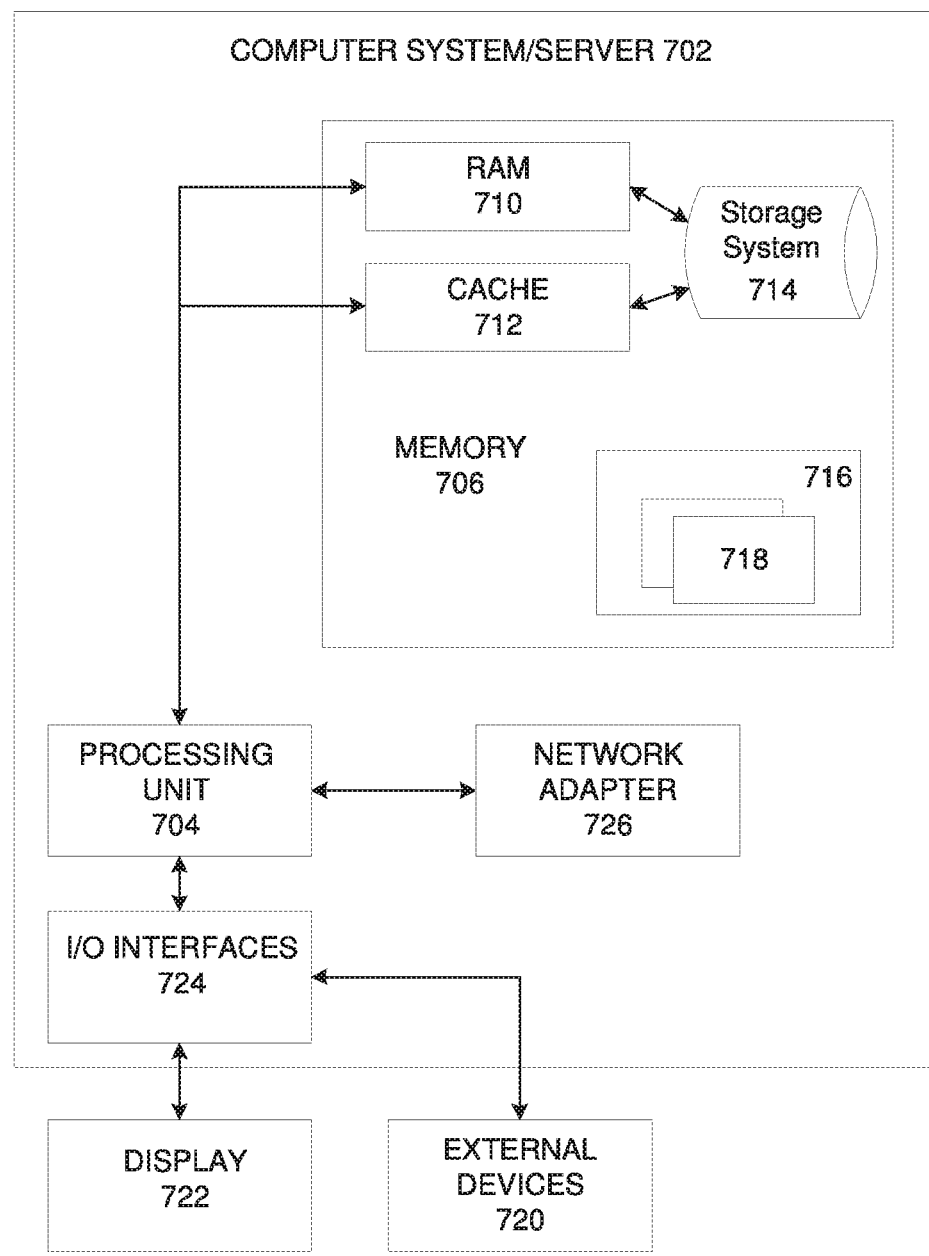
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the network interface 726 may receive a request to execute a blockchain transaction from a client node. In response, the processor 704 may execute the blockchain transaction which generates modifications to an asset. Furthermore, the processor 704 may identify a most recent version of the asset that comprises most recent values of the asset before the blockchain transaction. For example, the most recent version of the asset may be determined from a world state of the asset identified from a hash-linked chain of delta blocks of the asset. The processor 704 may generate a new delta block for the executed blockchain transaction that identifies differences between the modifications to the asset and the most recent version of the asset from the world state. The differences are introduced by the executed blockchain transaction and exclude or have other removed unmodified values of the most recent version of the asset which are not modified by the executed blockchain transaction. In addition, the processor 704 may hash the delta block to generate a hashed delta block and store the hashed delta block on a distributed ledger.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system, comprising:
  a network interface configured to receive a blockchain transaction; and
  a processor configured to
    execute the blockchain transaction which generates modifications to an asset,
    identify a most recent version of the asset that comprises most recent values of the asset before the blockchain transaction,
    generate a delta block for the executed blockchain transaction that identifies differences between the modifications to the asset and the most recent version of the asset introduced by the executed blockchain transaction and that excludes unmodified values of the most recent version of the asset which are not modified by the executed blockchain transaction, and
    hash the delta block to generate a hashed delta block and store the hashed delta block on a distributed ledger.

2. The computing system of claim 1, wherein the generated delta block comprises a write-set for the executed blockchain transaction that includes a list of asset values that are at least one of new, updated, and deleted by the executed blockchain transaction and that excludes any asset value of the most recent version of the asset not modified by the executed blockchain transaction.

3. The computing system of claim 1, wherein the generated delta block comprises a list of modified key/value pairs of the asset introduced by the executed blockchain transaction and excludes unmodified key/value pairs of the asset of the most recent version of the asset.

4. The computing system of claim 1, wherein the most recent version of the asset comprises a set of key/value pairs, and the modifications to the asset introduced by the blockchain transaction comprises modifications to only a partial set of key/value pairs from the set of key/value pairs.

5. The computing system of claim 1, wherein the processor is configured to identify the most recent version of the asset from a world state of the blockchain.

6. The computing system of claim 1, wherein the processor is further configured to insert a pointer within the delta block that references to a previous delta block on the distributed ledger that corresponds to a most recent transaction that has modified the asset.

7. The computing system of claim 1, wherein the processor is configured to store the generated delta block in a chain of delta blocks hash-linked together and which includes a head block that stores initial asset values of the asset.

8. The computing system of claim 7, wherein the chain of delta blocks hash-linked together comprises an incremental linked list that identifies transactions and modifications to the asset in chronological order.

9. A method, comprising:
  executing a blockchain transaction which generates modifications to an asset;
  identifying a most recent version of the asset comprising most recent values of the asset before the blockchain transaction;
  generating a delta block for the executed blockchain transaction identifying differences between the modifications to the asset and the most recent version of the asset introduced by the blockchain transaction being executed while excluding unmodified values of the most recent version of the asset which are not modified by the executed blockchain transaction; and
  hashing the delta block to generate a hashed delta block and storing the hashed delta block on a distributed ledger.

10. The method of claim 9, wherein the generated delta block comprises a write-set for the executed blockchain transaction that includes a list of asset values that are at least one of new, updated, and deleted by the executed blockchain transaction and that excludes any asset value of the most recent version of the asset not modified by the executed blockchain transaction.

11. The method of claim 9, wherein the generated delta block comprises a list of modified key/value pairs of the asset introduced by the executed blockchain transaction and excludes unmodified key/value pairs of the asset of the most recent version of the asset.

12. The method of claim 9, wherein the most recent version of the asset comprises a set of key/value pairs, and the modifications to the asset introduced by the blockchain transaction being executed comprises modifications to only a partial set of key/value pairs from the set of key/value pairs.

13. The method of claim 9, wherein the identifying comprises identifying the most recent version of the asset from a world state of the blockchain.

14. The method of claim 9, further comprising inserting a pointer within the delta block that references to a previous delta block on the distributed ledger corresponding to a most recent transaction that has modified the asset.

15. The method of claim 9, wherein the storing comprises storing the generated delta block in a chain of delta blocks hash-linked together and including a head block storing initial asset values of the asset.

16. The method of claim 15, wherein the chain of delta blocks hash-linked together comprises an incremental linked list identifying modifications to the asset in chronological order.

17. A non-transitory computer readable medium comprising instructions, that when read by a processor, cause the processor to perform:
    executing a blockchain transaction which generates modifications to an asset;
    identifying a most recent version of the asset comprising most recent values of the asset before the blockchain transaction;
    generating a delta block for the executed blockchain transaction identifying differences between the modifications to the asset and the most recent version of the asset introduced by the blockchain transaction being executed while excluding unmodified values of the most recent version of the asset which are not modified by the executed blockchain transaction; and
    hashing the delta block to generate a hashed delta block and storing the hashed delta block on a distributed ledger.

18. The non-transitory computer readable medium of claim 17, wherein the generated delta block comprises a write-set for the executed blockchain transaction that includes a list of asset values that are at least one of new, updated, and deleted by the executed blockchain transaction and that excludes any asset value of the most recent version of the asset not modified by the executed blockchain transaction.

19. The non-transitory computer readable medium of claim 17, wherein the generated delta block comprises a list of modified key/value pairs of the asset introduced by the executed blockchain transaction and excludes unmodified key/value pairs of the asset of the most recent version of the asset.

20. The non-transitory computer readable medium of claim 17, wherein the most recent version of the asset comprises a set of key/value pairs, and the modifications to the asset introduced by the blockchain transaction being executed comprises modifications to only a partial set of key/value pairs from the set of key/value pairs.

* * * * *